Oct. 21, 1930.  A. E. DE KONING  1,778,971

SAWING MACHINE

Filed June 20, 1929

Inventor

Arthur E. De Koning

Patented Oct. 21, 1930

1,778,971

UNITED STATES PATENT OFFICE

ARTHUR E. DE KONING, OF PORTLAND, OREGON

SAWING MACHINE

Application filed June 20, 1929. Serial No. 372,443.

My invention relates to self contained sawing machines in which a swinging saw carriage is mounted upon a horizontal shaft situated below the saw arbor and in which the movement of the saw and carriage is limited by a pair of oppositely disposed reflecting springs.

The principal object of my invention is to effect an economy of manufacture and transportation by the conservation of materials and consequent reduction of weight.

Other objects and advantages of my invention are apparent in the following discourse wherein the significance of the reference numerals in the accompanying drawings, details of construction and operation, and its particular utility are explained.

Figure 3:
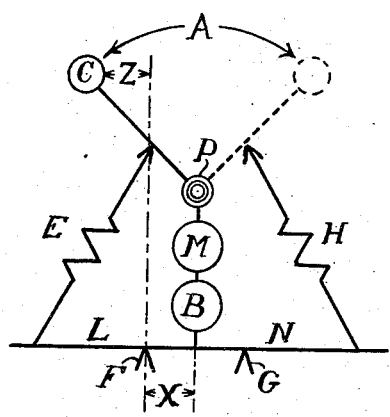
Figure 1:
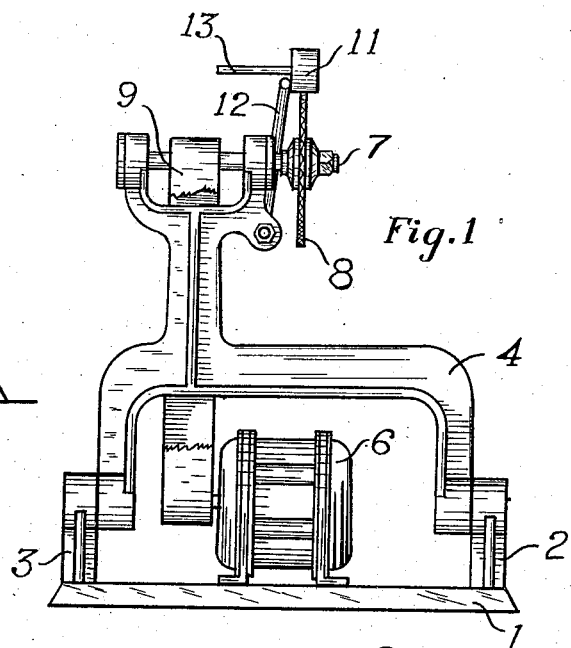
Figure 1 represents a front view of the complete machine in elevation.
Figure 4:
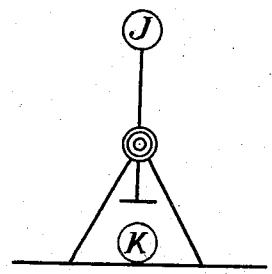
Figure 5:
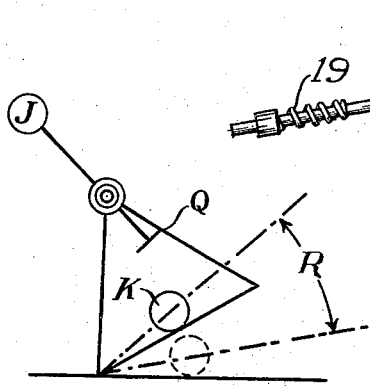

Figures 3, 4, and 5 are diagrams illustrative of certain properties and characteristics of the machine described in detail in the discourse.

Upon the base 1 two standards 2 and 3 are formed to provide for the pivotal mounting of the saw carriage 4 upon two pintles as 5 secured in the said standards 2 and 3. A motor 6 is mounted upon the base 1 so that the shaft thereof will be in approximate alignment with the axis of oscillation of the carriage maintained by the said pintles.

A saw arbor 7 carrying the saw 8 is journaled in the upper end of the said carriage 4 in the usual manner. A belt 9 serves to transmit power from the motor to the arbor.

A saw guard composed of the two pieces 10 and 11 is rigidly secured to the saw carriage 4 by a U shaped piece 12, and a handle 13 is attached to the guard assembly for manual oscillation of the said carriage. Thus, when the lumber is cut, the hand of the operator grasping the handle 13 passes above the lumber, the saw arbor 7 below the lumber, and the piece 12 encompasses it.

To limit the motion of the saw carriage an assembly comprising a bracket 14 rigidly mounted upon the base 1, there is provided a swivel stop 15 pivoted in the bracket 14, a rod 16 pivotally attached to the carriage 4 at 17 passing through the swivel stop 15, and a pair of reflecting springs 18 and 19 to reflect the momentum of the saw carriage mounted upon opposite ends of the rod 16 to engage the stop 15 alternately as the carriage swings back and forth causing the rod to slide through the swivel stop 15.

The piece 11 forming the foremost part of the saw guard is hinged to the other part thereof 10 so that the forward lip 20 of the former may slide upon the upper surface of the lumber being cut despite the arcuate movement of the saw carriage accruing out of its pivotal mounting. Upon the return stroke of the carriage, the piece 11 descends by force of gravity to a position where its motion is limited by engagement of its inner cylindrical surface with the outer cylindrical surface of the piece 10 to which it is hinged. The saw is thus guarded at all positions of the carriage.

Though the peculiar arrangement and forms of the piece 12 and the saw guard and handle are details of my invention of great practical value, the essence of my invention lies in the special magnitudes and dispositions of the masses of the carriage assembly, motor, and base with particular reference to the amplitude of the oscillatory movement of the saw carriage.

Figure 2:
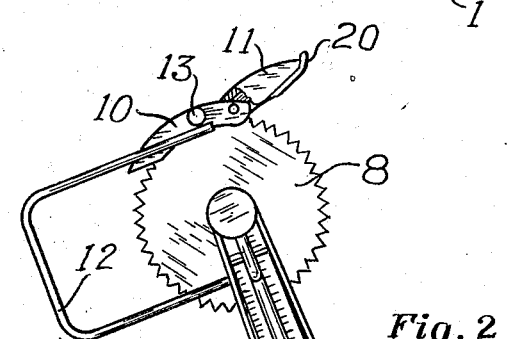
Figure 2 represents a side view of the complete machine in elevation.

The elements of my invention are represented by the plane figure illustrated in Figure 3, to be apposed with the lateral aspect of the machine normal to the axis of oscillation of its saw carriage as in Figure 2. Thus, a weight C (Figure 3) corresponding to the mass of the saw carriage is considered to be oscillatory through the arc A about a pivot P and between two elastic buffers E and H respectively, corresponding to the reflecting springs 18 and 19 of the machine. These two buffers E and H are in turn mounted upon lateral extensions L and N of the mass of the base B, corresponding to the two lateral extremities of the base of the machine L' and N' respectively.

The entire mass is considered to be supported upon two fulcra F and G. Superimposed upon the mass of the base B is the mass of the motor M. The masses of the motor M and the base B and the pivotal point P and lateral extensions L and N are rigidly related.

Now in this configuration of masses and supporting members certain relationships prevail upon which my invention is founded as follows:

The mass of the saw carriage deemed to be situated at C acts through a lever of the magnitude Z to overturn the machine upon the fulcrum F, whilst the combined masses of the base and motor deemed to be situated at B and M act to resist this force through a lever of the magnitude X. It will be apparent, therefore, that if the product of the combined masses of the base and motor times the length of the lever X is greater than the product of the mass of the saw carriage times the length of the lever Z, the machine at rest will be stable.

However, since the saw carriage oscillates between two reflecting springs, forces result from the reversal of the movement of the carriage tending to overturn the machine much greater than prevail when the machine is at rest. But since values of these forces depend upon the distance through which they act, varying values thereof may be provided by more or less elastic buffers as E and H to reflect such motion of the carriage, and hence the velocity and mass factors of the momentum of the carriage which may be employed without danger of overturning the machine may be likewise varied. All of which is in contradistinction to machines having the elements represented by the Figures 4 and 5.

Figure 4 represents an arrangement of masses of an oscillatory carriage J, and base K in which the motion of the carriage J is limited by inflexible means engaging as represented at Q in Figure 5. From the latter figure it will be evident that the energy of the moving saw carriage J possible of reflection by the resistance of the base K is determinate and of a value equal to the mass of the base K times the distance through which it is elevated, and also that this resistance to overturning varies as the cosine of the angle R and that the upsetting force accruing out of the arrest of the motion of the carriage J is enhanced by the action of gravity in like measure.

In comparison to this, the machine of my invention provides for two distinct factors of resistance to overturning of the machine when the saw carriage is reversed at the end of the stroke capable of reflecting a greater momentum of the carriage, namely, that afforded by the compression of the reflecting springs, and that afforded by the elevation of the mass of the base to that position it would attain when the machine is in equipoise upon the lateral edge of the base as L' in Figure 2.

Besides these advantages provided for by the special arrangement of the various members described, the placement of the motor 6 upon the base allows of decreasing the weight of the base casting otherwise necessary to afford stability of the machine, to that of a casting of such dimensions as will provide satisfactorily against the stresses imposed upon it. Thus, the mass of the motor 6, a property ordinarily without a function in machines of this type is substituted for that extra weight of the base casting in excess of that required for strength.

Having described my invention, what I claim is:

1. In self contained sawing machines, a relatively light base casting and driving motor mounted thereupon, the combined masses of which oppose the upsetting moment of a swinging saw-carriage pivotally mounted upon said base when said saw-carriage is at either extremity of its swing and in a state of rest, and a pair of reflecting springs engaging the said saw-carriage at opposite ends of the stroke thereof to resist and retard the motion of the said saw-carriage through an appreciable angular movement thereof so that the kinetic energy of the swinging carriage thus retarded is resolved by the compression of one of the said pair of springs in engagement into a relatively small force acting through an appreciable distance disposed within the extreme limits of motion of said carriage and whereat the machine is in stable equilibrium only when said carriage is at rest.

2. In self contained sawing machines, a relatively light base casting and driving motor mounted thereupon the combined masses of which oppose the upsetting moment of a swinging saw carriage pivotally mounted upon said base when said saw-carriage is at either extremity of its swing and in a state of rest, and a pair of reflecting springs engaging the said saw-carriage at opposite ends of the stroke thereof to resist and retard the motion of the said saw-carriage through an appreciable angular movement thereof so that the kinetic energy of the swinging carriage thus retarded is resolved by the compression of one of the said pair of springs in engagement into a relatively small force acting through an appreciable distance disposed within the extreme limits of motion of said carriage whereat the machine is in stable equilibrium only when said carriage is at rest and wherein the axis of oscillation of said saw-carriage is aligned with the shaft of said motor.

3. In self contained sawing machines, a relatively light base casting and driving motor mounted thereupon the combined masses of which oppose the upsetting moment of a swinging saw-carriage pivotally mounted upon said base when said saw carriage is at either extremity of its swing and in a state of rest, a saw guard and handle rigidly attached to said saw-carriage by means of a U shaped piece adapted to encompass the work table with which the machine is used, and a pair of reflecting springs engaging the said saw carriage at opposite ends of the stroke thereof to resist and retard the motion of the said saw-carriage through an appreciable angular movement thereof so that the kinetic energy of the swinging carriage thus retarded is resolved by the compression of one of the said pair of springs in engagement into a relatively small force acting through an appreciable distance disposed within the extreme limits of motion of said carriage whereat the machine is in stable equilibrium only when said carriage is at rest and wherein the axis of oscillation of said saw-carriage is aligned with the shaft of said motor.

ARTHUR E. DE KONING.